United States Patent [19]
Kezer

[11] 3,744,688
[45] July 10, 1973

[54] CARRIER DEVICE FOR WHEELED VEHICLES

[76] Inventor: Thatcher W. Kezer, 241 Ferry Road, Salisbury, Mass. 01950

[22] Filed: Sept. 27, 1971

[21] Appl. No.: 183,844

[52] U.S. Cl. .............................. 224/32 R, 224/39 R
[51] Int. Cl. .............................................. B62j 11/00
[58] Field of Search ............. 224/32 R, 30 R, 30 A, 224/39 R, 41, 42.03 R, 5 E

[56] References Cited
UNITED STATES PATENTS
2,803,387  8/1957  Pearce ................................. 224/5 E
2,360,767  10/1944  Elmquist ........................... 224/39 R
FOREIGN PATENTS OR APPLICATIONS
17,861  6/1903  Great Britain ..................... 224/32 R
369,529  3/1939  Italy .................................. 224/39 R
25,480  0/1920  Denmark .......................... 229/39 R Primary Examiner—Gerald M. Forlenza
Assistant Examiner—Jerold M. Forsberg
Attorney—Sewall P. Bronstein, Robert F. O'Connell et al.

[57] ABSTRACT

A device for carrying rod-like items, such as fishing rods, on a vehicle, such as a bicycle, which device includes a tubular member attached to the front wheel thereof, which member has an elongated slot, and an upper member attached to the handlebars thereof which member has a spiral shaped open ring positioned above and in alignment with the opening of the tubular member so that the upper portion of a fishing rod is held in the open ring while the handle thereof is held in the tubular member.

7 Claims, 6 Drawing Figures

CARRIER DEVICE FOR WHEELED VEHICLES

DISCLOSURE OF THE INVENTION

INTRODUCTION

This invention relates generally to a device for carrying relatively long, tubular-shaped items on a hand-steered, wheeled vehicle and, more particularly, to a device for carrying on a bicycle fishing rods which have varying lengths and diameters and which use reels of many different types.

DESCRIPTION OF THE PRIOR ART

Few devices for carrying fishing rods and reels, or other rod-like items, on a bicycle or the like have been suggested in the prior art. One particular known device is shown in U.S. Pat. No. 3,167,284, issued to J. Lynch on Jan. 26, 1965, which patent discloses the use of a tube affixed in an upright position to the hub of the front wheel of a bicycle with the upper, open end thereof having a downward taper directed away from the bicycle wheel and the lower end being closed except for a drain hole therein to define a support surface for the rod handle. Such device has clear disadvantages in that it is not designed to be readily adaptable to hold rods of varying sizes. Moreover, the use of a single holder in the form of such tube mounted at the wheel hub does not prevent the rod from wobbling, or toppling over and out from the holder, it apparently being required that the rider of the bicycle somehow hold the upper portion of the rod manually, or in some other unspecified manner, particularly when attempting to carry relatively long rods, or rods having different reel structures.

DESCRIPTION OF THE INVENTION

This invention discloses a rod carrier device which permits the carrying of rods having reels of various configurations, which rods are of varying lengths and diameters. At the same time, the device provides for good clearance of the reels thereof from the wheel structure of the bicycle without interfering with the activities of the rider. Moreover, the rod is held in a relatively steady vertical position and is not permitted to move unduly during travel so that the rod and reel are prevented from falling out, or from otherwise being damaged.

The carrier device comprises two principle parts, a first part including a hollow tubular member attached firmly to the hub of the wheel and to the frame of the vehicle and having an elongated longitudinal slot formed therein and a second part including an open ring member appropriately clamped to the handle bars of the vehicle above the tubular member. In use, the upper, or pole, portion of a fishing rod is inserted into the open ring member and the handle thereof is then inserted into the tubular member so that the rod reel and arm thereof rests on the top of the tube or in a preferred embodiment on a suitable seat and notch formed therein at the top of the tube, the handle of the rod primarily extending through the tube itself. As described in more detail below, for rods having particularly long handles an additional elongated slot is formed in the tubular member so that such handles may be readily inserted with no problem.

The operation and structure of the invention can be described in more detail with the help of the accompanying drawings wherein FIG. 1 shows the structure of a particular embodiment of the invention in use on a bicycle;

Figure 1:
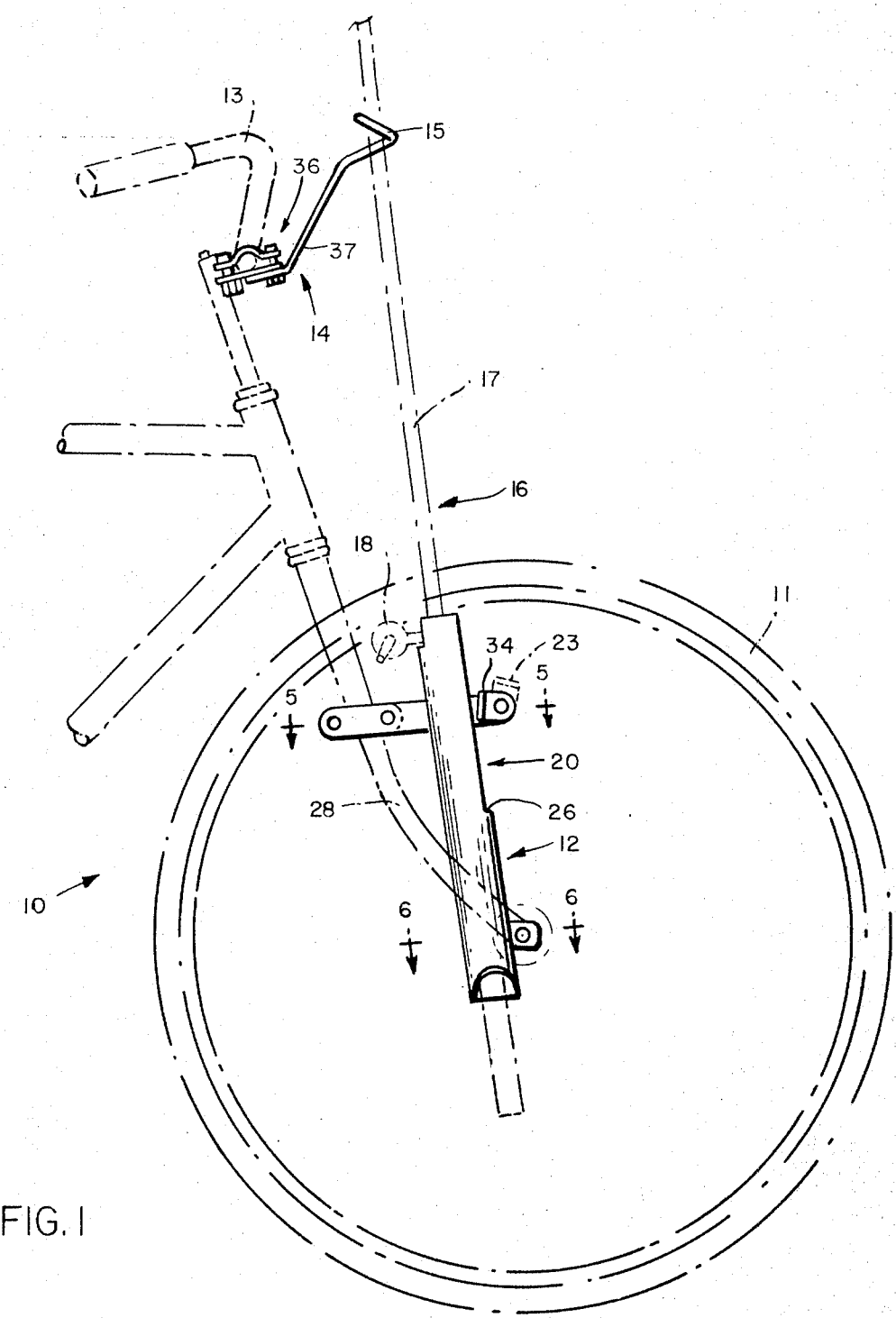

FIG. 1 depicts the front portion of a bicycle 10, shown generally in phantom, having a front wheel 11 to the axle of which is attached a tubular member 12 oriented in a generally upright position. An upper member 14 having an open ring 15 is appropriately clamped to the handle bars 13 of the bicycle so as to project forwardly therefrom to a position wherein the open ring 15 is located effectively above and in alignment with the top opening of the tubular member 12. A fishing rod 16 is carried by such members in a manner such that the elongated upper, or pole, portion 17 thereof extends through the open ring 15 and the handle thereof is inserted in tubular member 12 with its reel 18 and reel arm appropriately seated at the upper end of tube 12.

The fishing rod 16 can be readily placed in the carrier of the invention by first slipping the pole portion 17 thereof into the open ring 15 through the opening thereof and then inserting the handle of the rod into the tubular member 12. In order to facilitate the placement and removal of rods, particularly those which are relatively long so that the rod cannot be readily lifted high enough above tubular member 12 to permit easy insertion through the top opening thereof, a slot 20 is formed in the side of tube 12 so that the rod may be more easily inserted therein. In removing the rod from the carrier the rod handle is merely lifted out of the tubular member 12 through the slot 20 and the rod portion is then slipped out from open ring 15.

Figure 5:
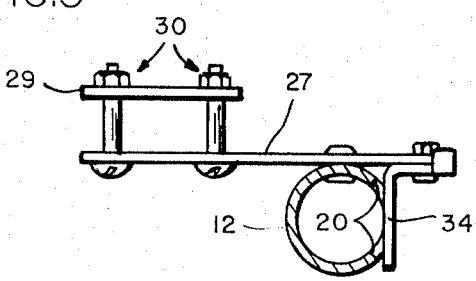
FIG. 5 shows a view in section of the tubular member of the invention taken along line 5—5 of FIG. 1.
Figure 4:
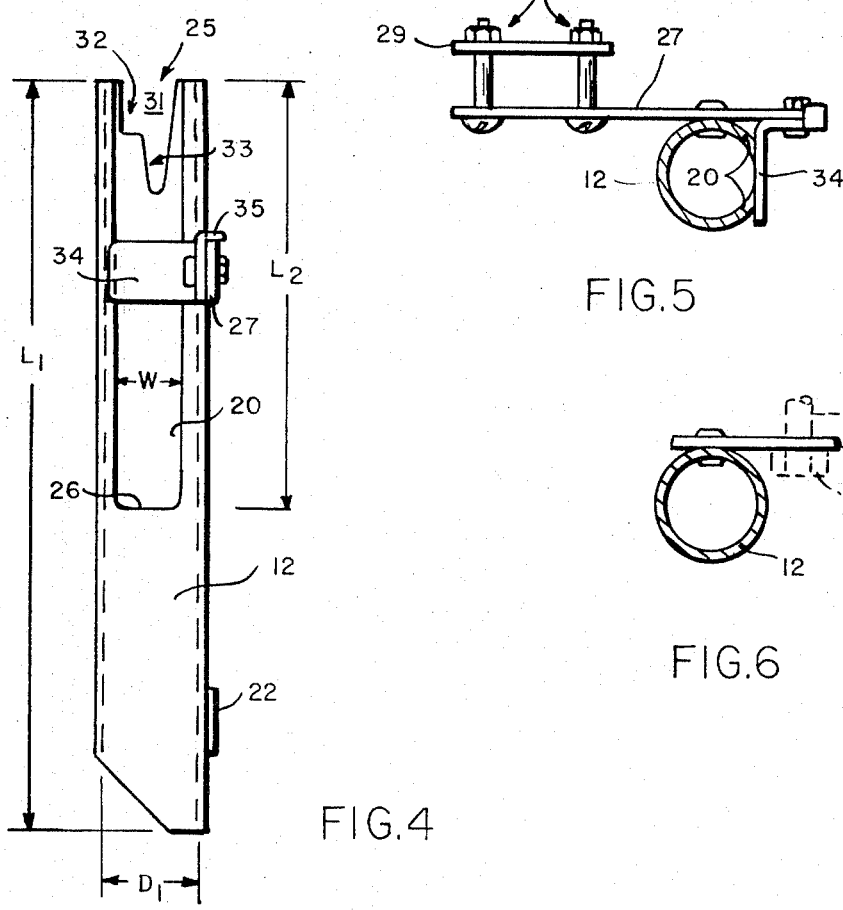
FIG. 4 shows a more detailed view from the side of the tubular member of the invention.
Figure 6:
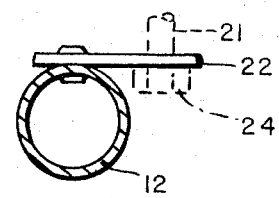
FIG. 6 shows a view in section of the tubular member of the invention taken along line 6—6 of FIG. 1.

FIGS. 4-6 show a more detailed illustration of tubular member 12 and, as seen therein, such member is suitably attached to the axle 21 of front wheel 11 at the hub thereof by a rectangular bracket 22 attached to tube 12 and having an opening which fits over the threaded end of axle 21 and is secured by axle nut 24, as shown. Elongated slot 20 extends from the top opening 25 of tube 12 downwardly in a longitudinal direction along the tube to a point which in a particular embodiment may lie about halfway down the tube, or lower. The lower edge 26 of slot 20 may be tapered outwardly, as shown. A rectangular brace member 27 is affixed at an intermediate point thereof to tubular member 12 between bracket 22 and the top of tube 12. Brace member 27 is affixed to the fork 28 of the bicycle frame by a clamp member 29 located at one end of brace 27. The fork is held between the end of the brace 27 and clamp 29 by bolt and nut pairs 30.

Oppositely disposed to slot 20 is a cut-away portion 31 of the tube 12 at the top thereof. Cut-away portion 31 has a configuration which includes an L-shaped seat 32 and a V-shaped notch 33 located adjacent seat 32 and extending therebelow. An L-shaped, movable latch member 34 is positioned at the other end of brace 27 and is arranged to be placed either in an unlatched position, as shown by the dashed lines 23 in FIG. 1, or rotated to a latched position as shown by the solid lines in FIGS. 1, 4 and 5. In its latched position, one surface of latch 34 rests in a position adjacent a portion of slot 20 intermediate the ends thereof. The latch 34 is suitably held in its latched position by a catch member 35, which overlaps a portion of brace 27 in the latched position.

In the use of the invention, at least a portion of the handle of a fishing rod is placed in tubular member 12 so that, for example, a part of the reel thereof is permitted to rest on seat 32, within notch 33, or on a part of the upper rim of tube 12, depending on the type of reel being carried. Accordingly, by the use of the seat and notch a large number of different rod and reel configurations can be accommodated in a preferred embodiment of the invention. Moreover, in the case of some fly rods, the reels thereof may be permitted to rest on the tapered lower edge 26 of slot 20 so even more rod and reel types can be readily accommodated.

If the handle of the fishing rod being carried is sufficiently long it will extend to a position well below the lower edge of the slot so that it is adequately held within the tubular member 12. In such case the latch may be placed either in its unlatched or its latched position once the rod is inserted in the tube. If, however, the handle of the rod is not long enough to extend sufficiently below the lower edge of slot 20, the latch 34 is placed in its latched position so that the handle is securely held within the tubular structure and cannot escape through the slot during use.

Figure 2:
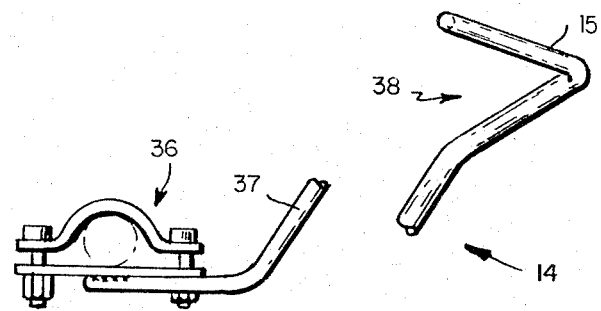
FIG. 2 shows a more detailed perspective view from the side of the open ring member of the invention.
Figure 3:
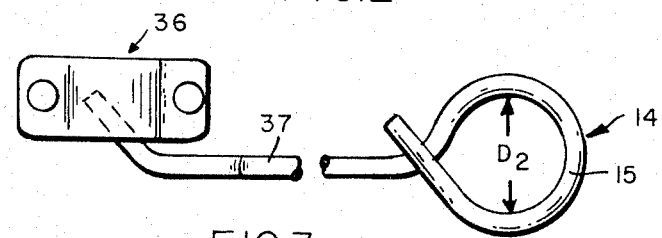
FIG. 3 shows a more detailed perspective view from the top of the open ring member of the invention.

FIGS. 2 and 3 show the upper holding member 14 used in conjunction with tubular member 12. Upper member 14 comprises a clamp 36 which permits the arm 37 of member 14 to be clamped to the handle bars of a bicycle. Arm 37 extends upwardly and outwardly away from the clamp 36 in a forward direction and has an open ring 15 formed in an open spiral shape at the outwardly extended end thereof. Open ring 15 thereof may be covered with a suitable plastic, or other protective, coating which assists in preventing damage to the fishing rod during use. One type of protective coating which has been found useful is that type sold in the form of a tube of plastic material which can be slipped over the open ring 15 as a protective sheath thereon. Arm 37 is appropriately shaped so that open ring member 15 is positioned above tube member 12 in substantial alignment with the top opening thereof. Thus, the fishing rod which is to be carried has its pole portion inserted through the opening 38 of open ring 15.

For many rod sizes the rod can often be lifted high enough above the tube 12 after its pole portion has been slipped into open ring 15 so that the handle can be readily inserted into the top opening of tube 12 without the need for the presence of slot 20. However, in order to make the carrier device more useful in carrying many different rod sizes, slot 20 is provided in tube 12 for those rods the handles of which are so long and so thick in diameter that they cannot be lifted high enough above tube 12 before the handle contacts and becomes wedged in open ring 15 so that it is prevented from being lifted further. Moreover, for some rods it is not possible to lift the rod sufficiently high before one of the eyes through which the fishing line is strung comes into contact with open ring 15 so as to prevent the rod from being lifted further. In such cases, the slot 20 permits the handle of the rod to be readily inserted into tubular member 12 from the side thereof.

The carrier member of the invention is readily adaptable for use with rods and reels of many types and rods of many different lengths and different handle diameters without any difficulty. In one preferred embodiment thereof, a tubular member having a length $L_1$, as shown in FIG. 4 of about 13.0 inches, an inner diameter $D_1$ of about 1.50 inches, a slot length $L_2$ of about 7.5 inches, and a slot width W of about 1.25 inches has proved satisfactory for most rods expected to be so carried. An open ring having an inner diameter $D_2$ of about 1.0 inches has also proven satisfactory for most rods. While the carrier is shown as mounted on the right-hand side of a bicycle, it may also be fabricated to be mounted at the left-hand side thereof with appropriate changes being made therein. The device may be fabricated from a metallic material or from a durable and strong plastic material, for example.

I claim:

1. A device for carrying rod-like items on a wheeled vehicle comprising
   a tubular member open at both ends and having a slot formed therein extending longitudinally from one end thereof and a cut-away portion at said one end, said cut-away portion forming a seat and a notch adjacent and extending below said seat;
   means for mounting said tubular member on a wheel of said vehicle;
   an upper member having an arm with clamp means at one end and a substantially rigid open ring at the other end thereof, said clamp means for mounting said upper member on the handle bars of said vehicle in a position such that said arm extends outwardly from said handle bars and said open ring is positioned above and in substantial alignment with said tubular member.

2. A carrying device in accordance with claim 1 wherein said rod-like item is a fishing rod.

3. A carrying device in accordance with claim 1 and further including
   a latch member movably mounted adjacent said tubular member near said slot for movement from an unlatched position away from said slot to a latched position adjacent a portion of said slot for retaining the lower portion of said rod-like item inserted in said tubular member.

4. A carrying device in accordance with claim 1 wherein said notch is substatially V-shaped.

5. A carrying device in accordance with claim 1 wherein said bicycle has a frame, an axle for the front wheel thereof and further wherein said tubular member mounting means includes
   bracket means for attaching said tubular member to the axle of said front wheel; and
   brace means for affixing said tubular member to the frame of said bicycle.

6. A carrying device in accordance with claim 5 wherein said brace means is affixed to the front fork of said frame.

7. A carrying device in accordance with claim 1 wherein said open ring has a protective coating thereon for preventing damage to said rod-like item being carried therein.

* * * * *